United States Patent
St. Pierre

(10) Patent No.: US 8,001,243 B2
(45) Date of Patent: Aug. 16, 2011

(54) DISTRIBUTED DENIAL OF SERVICE DETERRENCE USING OUTBOUND PACKET REWRITING

(75) Inventor: Robert Paul St. Pierre, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 300 days.

(21) Appl. No.: 12/267,478

(22) Filed: Nov. 7, 2008

(65) Prior Publication Data

US 2010/0121903 A1    May 13, 2010

(51) Int. Cl.
*G06F 15/173* (2006.01)
(52) U.S. Cl. ........................ 709/225; 709/224
(58) Field of Classification Search .................. 709/223, 709/224, 225
See application file for complete search history.

(56) References Cited

U.S. PATENT DOCUMENTS

| | | | |
|---|---|---|---|
| 2002/0194505 A1* | 12/2002 | Muschenborn | 713/201 |
| 2004/0093521 A1* | 5/2004 | Hamadeh et al. | 713/201 |
| 2005/0216770 A1* | 9/2005 | Rowett et al. | 713/201 |
| 2007/0107059 A1* | 5/2007 | Chasin et al. | 726/23 |
| 2008/0134330 A1* | 6/2008 | Kapoor et al. | 726/22 |

OTHER PUBLICATIONS cPacket Networks, Technology, www.cpacket.com/technology.html, 2007, 2 pages.

* cited by examiner

*Primary Examiner* — Kristie D Shingles
(74) *Attorney, Agent, or Firm* — Osha • Liang LLP

(57) ABSTRACT

A method for denial of service attack deterrence involves receiving requests from clients, where the requests include a server protocol component, designating a client as a malicious client based on the requests, intercepting and inspecting, prior to the clients receiving a response, the server protocol component of each response to the clients, and rewriting at least a portion of the server protocol component of each response destined for the malicious client.

19 Claims, 4 Drawing Sheets

DISTRIBUTED DENIAL OF SERVICE DETERRENCE USING OUTBOUND PACKET REWRITING

BACKGROUND

Distributed denial of service (DDOS) attacks occur when a malicious user seeks to stop or severely limit access to a website. To achieve this, the malicious user may attack the website in a variety of ways, such as attempting to overwhelm the servers of the website by bombarding the servers with requests.

Currently, most servers implement in some fashion, an intrusion detection system (IDS) which is used to help determine when a DDOS attack is occurring, and where the DDOS attack is coming from. Typically, an IDS sounds alarms and alerts human operators that something is wrong. It is then up to the human operators to determine how to respond to the DDOS attack.

SUMMARY

In general, in one aspect, the invention relates to a method for denial of service attack deterrence. The method involves receiving a plurality of requests from a plurality of clients, wherein the plurality of requests comprises a server protocol component, designating one of the plurality of clients as a malicious client based on the plurality of requests, intercepting and inspecting, prior to the plurality of clients receiving a response, the server protocol component of each response to the plurality of clients, and rewriting at least a portion of the server protocol component of each response destined for the malicious client.

In general, in one aspect, the invention relates to a system for denial of service attack deterrence. The system includes a plurality of clients with a processor having functionality to execute software instructions for sending a plurality of requests, wherein the plurality of requests comprises a server protocol component, and an intrusion detection system (IDS) communicatively connected to the plurality of clients and comprising a rewriting component with functionality to execute software instructions for: receiving a plurality of requests from the plurality of clients, wherein the plurality of requests comprises a server protocol component, designating a malicious client from the plurality of clients based on the plurality of requests, intercepting and inspecting, prior to the plurality of clients receiving a response, the server protocol component of each response to the plurality of clients, and rewriting at least a portion of the server protocol component of each response destined for the malicious client.

In general, in one aspect, the invention relates to a computer readable medium storing instructions for denial of service attack deterrence. The instructions comprise functionality to: receive a plurality of requests from a plurality of clients, wherein the plurality of requests comprises a server protocol component, designate one of the plurality of clients as a malicious client based on the plurality of requests, intercept and inspecting, prior to the plurality of clients receiving a response, the server protocol component of each response to the plurality of clients, and rewrite at least a portion of the server protocol component of each response destined for the malicious client.

Other aspects of the invention will be apparent from the following description and the appended claims.

DETAILED DESCRIPTION

Figure 1:
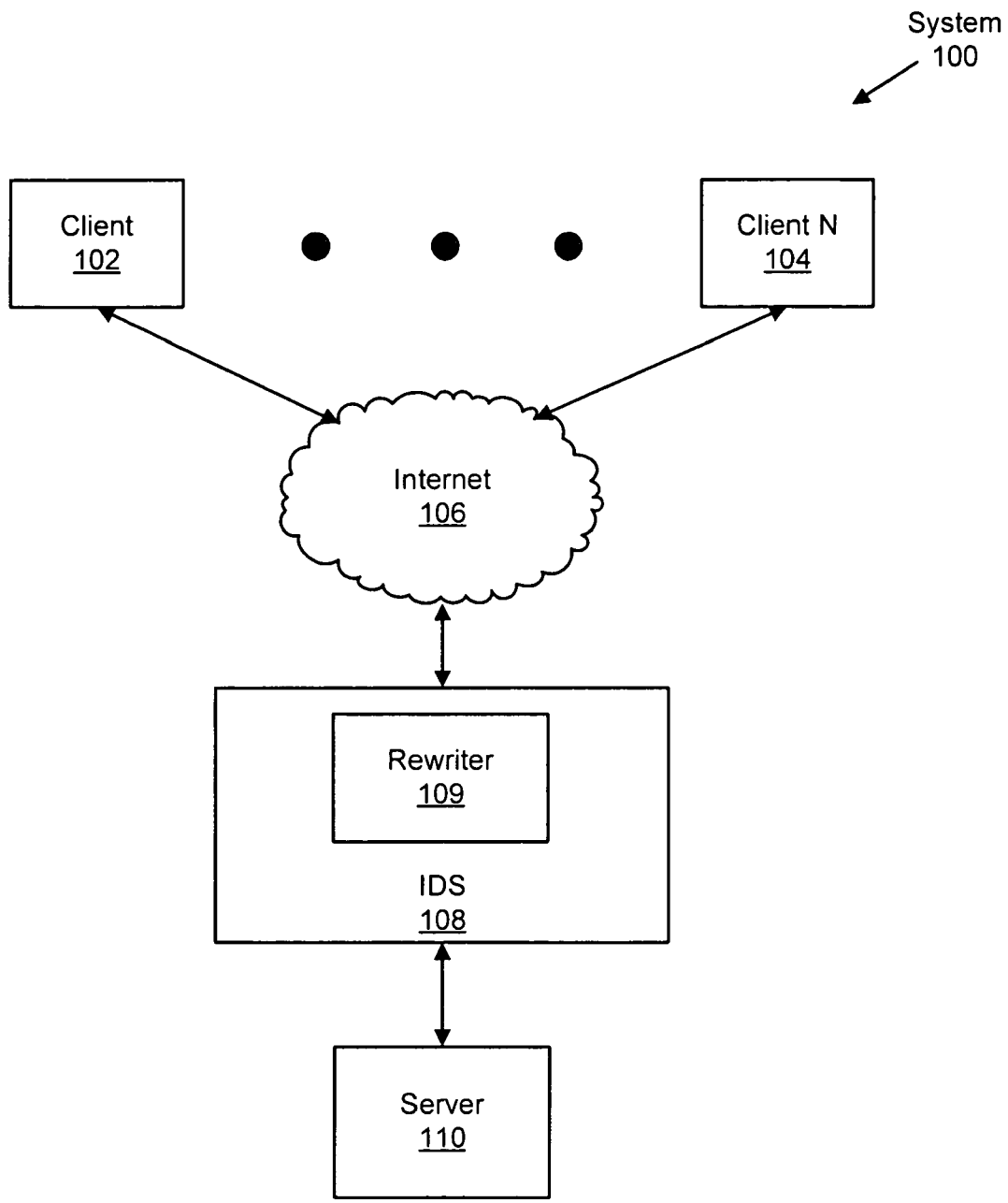
FIG. 1 shows a dataflow diagram of a network system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for deterring denial of service attacks. Specifically, in one or more embodiments of the invention, once a client has been determined to be malicious, portions of responses destined for the malicious client are rewritten. The rewritten responses are then received by the client. In one or more embodiments of the invention, the rewriting may be handled by an intrusion detection system (IDS) located on the network being attacked. For the purposes of the discussion below, the terms "response" and "answer" are used interchangeably when referring to a server answering/responding to a request.

FIG. 1 shows a network system in accordance with one or more embodiments of the invention. As shown in FIG. 1, the system (100) includes clients (i.e. client (102) and client N (104)), access to the Internet (106), an intrusion detection system (IDS) (108) which includes a rewriter (109), and a server (110). Each of the aforementioned components of FIG. 1 is discussed below.

Client (102) and client N (104) may be any device (e.g. personal computer, PDA, smart phone, handheld gaming device, etc) with a processor and capability to access a network, such as the Internet. The clients (e.g., client (102) and client N (104)) may access the network by a wired and/or wireless connection. In one or more embodiments of the invention, the clients (e.g., client (102) and client N (104)) are configured to send a request to the server (110) through the Internet (106). The request may be for information (e.g., the Internet Protocol (IP) address of a server, files, websites, server status, etc.). The request may be responded to by a server, or other device capable of answering requests.

Before a request from a client (e.g., client (102) or client N (104)) reaches the server (110) the request passes through an IDS (108). In one or more embodiments of the invention, the IDS (108) contains a rewriter (109). In one or more embodiments of the invention, the IDS (108) is used to determine whether an attack is being made on the server (110). Specifically, the IDS (108) monitors incoming traffic/requests for illegal requests, too many requests, blatant attempts to break through security, and other malicious events in accordance with one or more embodiments of the invention. After determining that a request is malicious, the IDS (108) may forward that information on to another device in the system, such as server (110), or may store the information itself. In one or more embodiments of the invention, the IDS (108) may be software based. Alternatively, the IDS (108) may be hardware based. In one or more embodiments of the invention the IDS (108) is located on the same device as server (110). Alternatively, the IDS (108) may be located on a different device than server (110). In one or more embodiments of the invention, the IDS (108) is communicatively coupled to server (110).

In one or more embodiments of the invention, the rewriter (109) is configured to inspect and rewrite responses from server (110) that are destined for malicious clients (e.g., client (102) or client N (104)). In one or more embodiments of the invention, rewriter (109) may be a chip, such as those produced by cPacket Networks Inc. In one or more embodiments of the invention, the rewriter (109) is capable of inspecting all responses sent from server (110) to all clients (e.g., client (102) or client N (104)), and is additionally capable of rewriting and/or truncating portions of the responses. For example, in one or more embodiments of the invention, when a malicious client requests the IP address of a website from a domain name system (DNS) server, the rewriter (109) inspects the DNS server's response and rewrites portions of the response. In one or more embodiments of the invention, the rewriter (109) may change the valid IP address of the website to a fictitious IP address such as the local host address, 127.0.0.1. Alternatively, the valid IP address may be changed to the malicious client's own address, an address of a different malicious client, or a non-routable address. It will be apparent to one of ordinary skill in the art that the IP address could be changed to any address outside of the network being attacked and still be within the scope of the invention.

Alternatively, the rewriter (109) may rewrite portions of responses other than the IP address of the server. For example, if the server being attacked is a Hypertext Transfer Protocol (HTTP) server, then the HTTP status response from the server could be rewritten from "200 OK" to "503 Service Unavailable," thereby making the attacker think that the attack has succeeded. Additionally, part of the response could be truncated as necessary. It will be apparent to one of ordinary skill in the art that any HTTP status response may be rewritten to any other HTTP status. Also, other server protocol responses may be rewritten (i.e., a simple mail transfer protocol (SMTP) response, etc.). Further, it will be apparent to one of ordinary skill in the art that so long as the portion of the response that is altered or truncated deters, slows, or stops an attack, such a rewriting of a server response is within the scope of the invention.

In one or more embodiments of the invention, the server (110) may be any machine with a processor (e.g. personal computer, blade servers, rack servers, etc.) that is capable of answering requests from clients. Examples of servers include, but are not limited to: DNS servers, HTTP servers, SMTP servers, etc. It will be apparent to one of ordinary skill in the art that many types of servers fall within the scope of the invention.

Optionally, in one or more embodiments of the invention, the system may include a load balancer (not shown). The load balancer may work in conjunction with the IDS (108). The load balancer may be responsible for managing incoming requests and splitting the requests up amongst a group of servers. Similar to the IDS (108) and the rewriter (109), load balancers inspect and potentially rewrite portions of incoming requests in order to direct them to the appropriate server.

Figure 2:
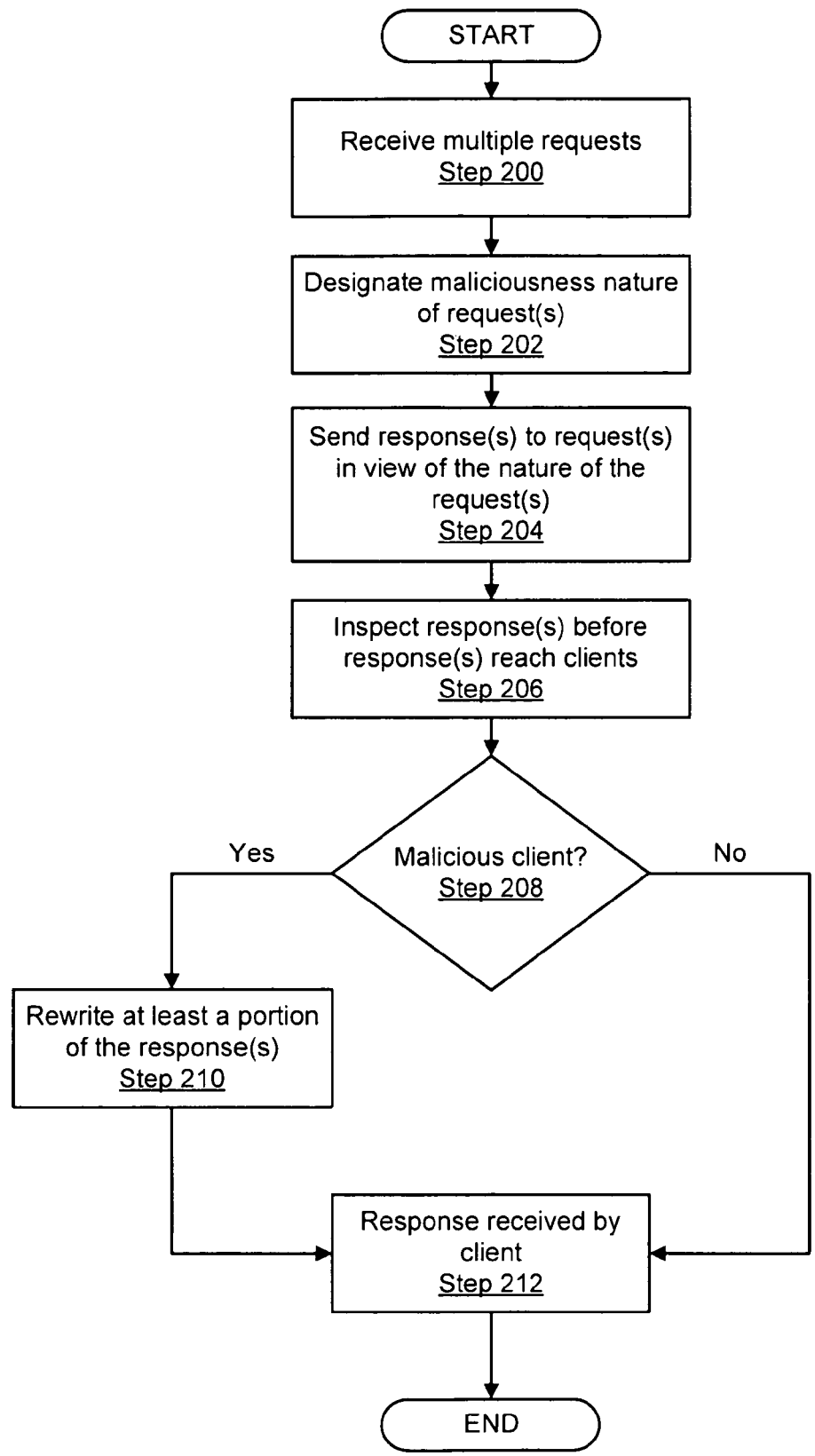
FIG. 2 shows a flowchart of a method in accordance with one or more embodiments of the invention.

FIG. 2 shows a flowchart of a method for deterring distributed denial of service attacks using outbound packet rewriting. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, multiple requests are received in accordance with one or more embodiments of the invention. In one embodiment of the invention, the requests are for the IP address of a particular device or service. The requests may be received from a multitude of clients using any device with a processor and the ability to access a network (e.g., laptop computer, PDA, smart phone, gaming device, etc). In one or more embodiments of the invention, the requests include a server protocol component. This component may be a request for a server's IP address, an HTTP request, an SMTP request, or any other request that contains a server protocol component.

In Step 202, the malicious nature of the requests is designated in accordance with one or more embodiments of the invention. A variety of factors may be looked at to help designate a request as malicious. For example, some relevant factors include, but are not limited to: requesting illegal data, requesting too much data, making too many requests, and attempting to bypass security measures. In one or more embodiments of the invention, the designation of malicious requests may be made by an IDS. Alternatively, the designation may be made by a server. In one or more embodiments of the invention, once the designation is made, all future requests from the same client are deemed malicious. In one or more embodiments of the invention, if clients are later deemed non-malicious, their designation may change to non-malicious. This may be accomplished by tracking the clients IP address. Optionally, if many malicious requests came from the same sub-network, then the entire sub-network may be designated as malicious. It will be apparent to one of ordinary skill in the art that any granularity of IP address may be designated as malicious (e.g., single IP address, entire sub-network of IP addresses, etc). The method then proceeds to Step 204.

In Step 204, responses are sent to the requests in accordance with one or more embodiments of the invention. As discussed above, the responses may be of any type that corresponds to the requests (i.e., HTTP response, SMTP response, IP address response, etc). The responses may be sent by a server. In one or more embodiments of the invention, the responses may be genuine (i.e., they return the actual data requested by the client). Alternatively, the responses may be fictitious (i.e., they return altered information to mislead the client).

In Step 206, the responses are inspected before the responses reach the clients in accordance with one or more embodiments of the invention. In one or more embodiments of the invention, this inspection will be handled before the response leaves the network of the machine that generated the response. In one or more embodiments of the invention, the inspection will be handled by a component of an IDS, such as a rewriter. The inspection may involve inspecting the entire answer generated in response to the client's request. Alternatively, only an individual section of a response, such as the server protocol component, may be inspected. In one or more embodiments of the invention, the inspection may be used to determine the IP address of the client, and thus determine if the response is being sent to a malicious client. After inspection, the method proceeds to Step 208.

In Step 208, a determination is made as to whether the client is a malicious client in accordance with one or more embodiments of the invention. If the client is malicious the method proceeds to Step 210; alternatively, if the client is non-malicious, the method proceeds to Step 212. For a malicious client, at least a portion of the response is rewritten (Step 210). In one or more embodiments of the invention, the server protocol component of the response is rewritten. Optionally, portions of the response may be truncated. For example, in one or more embodiments of the invention, if a request from a malicious client requested the IP address of a server, and the response included the proper IP address of the server, then the IP address of the server may be rewritten with a fictitious IP address. Specifically, the IP address of the server may be rewritten to 127.0.0.1 (the localhost address), the address of another malicious client, or a non-routable address, etc. It will be apparent to one of ordinary skill in the art that virtually any address could be used to rewrite the IP address of the server, and so long as the new address is outside the network to be protected, then it is within the scope of the invention.

Alternatively, in one or more embodiments of the invention, an HTTP status may be rewritten. For example, a status response of "200 OK" could be rewritten to "503 Service Unavailable," thereby making the malicious client think that the attack has succeeded. In one or more embodiments of the invention, an SMTP response could be rewritten similar to the ways described above. Optionally, in one or more embodiments of the invention, the transmission control protocol (TCP)/IP handshake between client and server may be interrupted. This may be accomplished by the server closing the connection, and sending a response that the connection has been closed. The response may then be rewritten to indicate that the connection is open, fooling the malicious client. It will be apparent to one of ordinary skill in the art that other kinds of attacks may be deterred by this method, and that many different responses may be rewritten. The method then proceeds to Step 212.

In Step 212, the response is received by the client in accordance with one or more embodiments of the invention. Malicious clients receive an altered response, while non-malicious clients receive a non-altered response. After receiving the response, the method ends.

Figure 3:
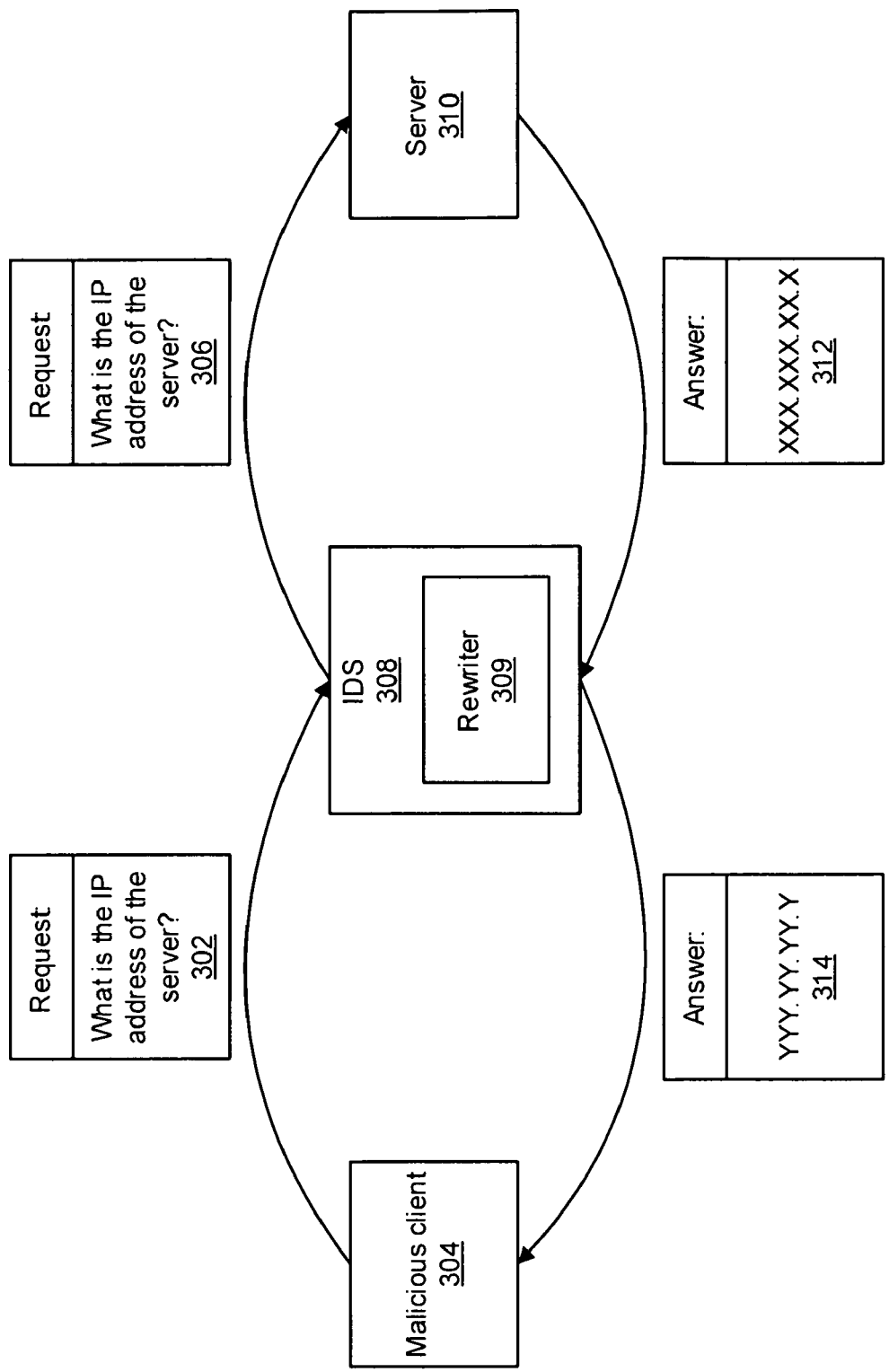
FIG. 3 shows a dataflow diagram of an example in accordance with one or more embodiments of the invention.

FIG. 3 shows an example in accordance with one or more embodiments of the invention. Specifically, the example in FIG. 3 shows a malicious client requesting the IP address of a server. As discussed above, there are many other requests and rewrites that could be done using the method of the invention, and the invention should not be limited to only rewriting IP addresses of servers.

Initially, the malicious client (304) sends a request (302 and 306) to the server (310). Before the request (e.g., box 302, box 306) is obtained by the server, the request (e.g., box 302, box 306) is intercepted by the IDS (308). In one or more embodiments of the invention, the IDS (308) does not stop the request from reaching the server because the IDS (308) only inspects the request. In this example, the malicious client (304) has already been designated as malicious (i.e., because this example takes place in the middle of an attack, or the client has already been designated malicious for another reason). For example, the designation of the malicious client (304) as malicious may have been determined by the IDS (308) by inspecting the type or volume of requests originating from the malicious client (304). In one or more embodiments of the invention, the designation of the malicious client (304) as malicious may have been forwarded to another part of the system, such as the server (310).

After passing through the IDS (308), the request (306) reaches the server (310). In this example, the server is a DNS server. However, as discussed above, the server may be any type of server (e.g., HTTP, SMTP, etc). After receiving the request (306), the server responds to the request. In this example, the request (e.g., box 302 and box 306) specifies, "what is the IP address of the server?" Therefore, the server generates an answer (312) that responds with, "XXX.XXX.XX.X" as the IP address corresponding to the request (e.g., box 302, box 306) by the malicious client (304) Suppose for purposes of this example that the answer is a genuine response (i.e., the real IP address of the server). However, as described above, in one or more embodiments of the invention, the response from the server may be fictitious (i.e., a fake IP address).

The answer (312) is then sent back to the malicious client (304). However, before the answer (312) reaches the malicious client (304), the answer (312) is intercepted by the IDS (308), because the IDS (308) is placed between the malicious client (304) and the server (310). When passing through the IDS (308), the answer (312) is inspected by the rewriter (309). As discussed above, the rewriter (309) is capable of inspecting and rewriting portions of answers sent to clients. In this example, the rewriter (309) inspects answer (312), and discovers that the answer (312) is addressed to a client that is deemed to be a malicious client (304). Therefore, the rewriter (309) rewrites a portion of the answer (312), changing the answer (312) from "XXX.XXX.XX.X" to "YYY.YY.YY.Y" (314). It will be apparent to one of ordinary skill in the art that the real IP address provided by the server in answer (312) may be rewritten to any IP address outside of the network. After being rewritten, the answer (314) continues on to the malicious client (304). When the malicious client (304) attempts to access the server with the IP address provided in response to the malicious client's request (302), the malicious client (304) is unable to access the server (310) because the IP address is not the correct IP address of the server (310).

Figure 4:
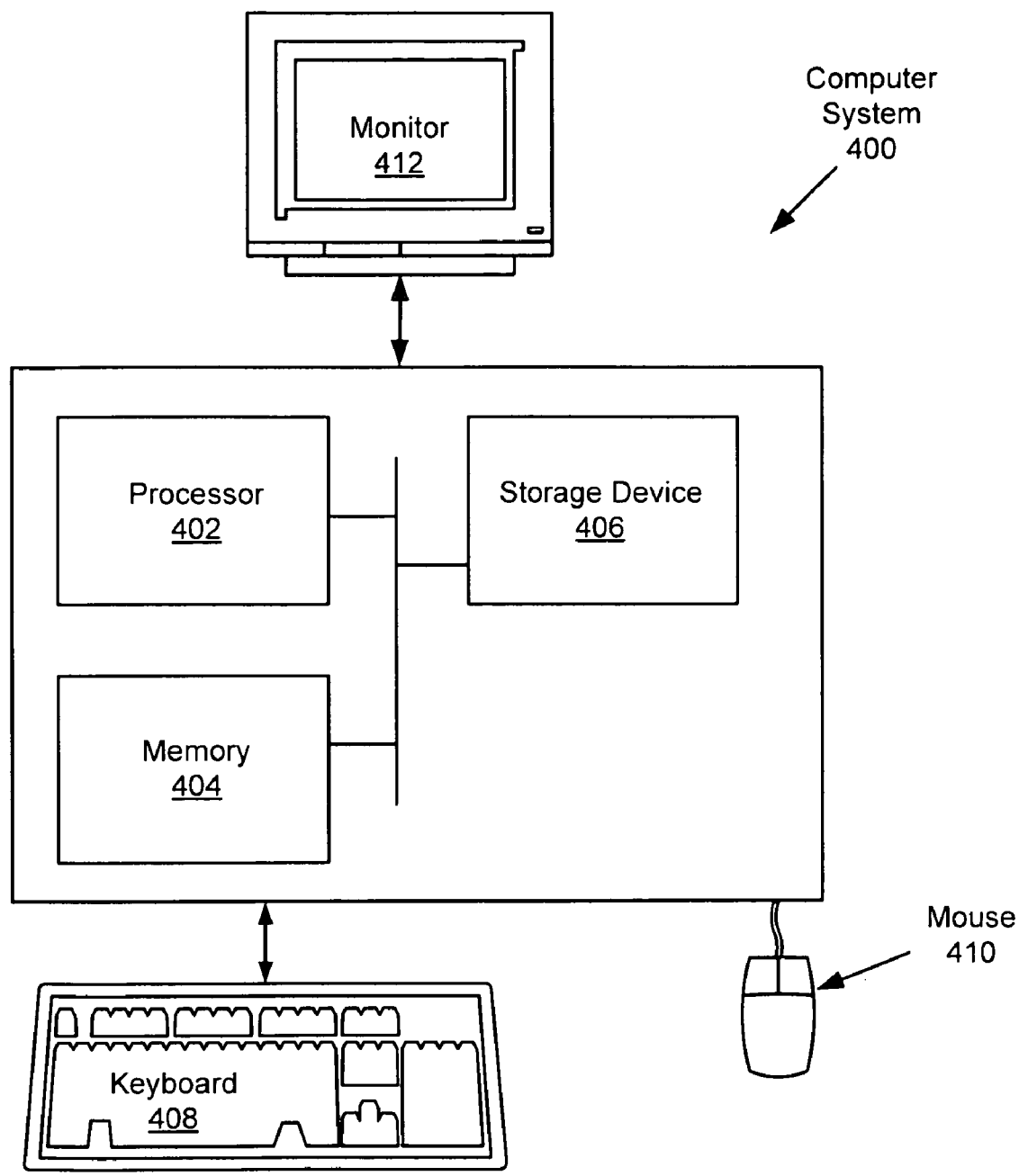
FIG. 4 shows a diagram of a computer system in accordance with one or more embodiments of the invention.

The invention may be implemented on virtually any type of computing device regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., intrusion detection system, response rewriter, server, client) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, or any other suitable tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for denial of service attack deterrence, comprising:
   identifying, using a hardware processor, a plurality of requests sent to a server from a plurality of clients;
   designating, using the hardware processor, one of the plurality of clients as a malicious client based on the plurality of requests;
   intercepting, using the hardware processor, a response issued by the server and in transit to the malicious client, wherein the response corresponds to at least one of the plurality of requests;
   adding, using the hardware processor and in response to intercepting the response, an error to the response by replacing an existing value in the response with a erroneous value; and
   forwarding, using the hardware processor, the response having the erroneous value to the malicious client.

2. The method of claim 1, further comprising:
   interrupting a TCP/IP handshake between the malicious client and the server,
   wherein the existing value corresponds to a closed status of a connection between the server and the malicious client, and
   wherein the erroneous value corresponds to an open status of the connection.

3. The method of claim 1, wherein the existing value is an internet protocol (IP) address of a website, and wherein the erroneous value is a fictitious IP address.

4. The method of claim 1, wherein the existing value is an internet protocol (IP) address of a website, and wherein the erroneous value is an IP address of the malicious client.

5. The method of claim 1, wherein the existing value is an actual status of the server, and wherein the erroneous value is a fictitious status of the server.

6. The method of claim 1, wherein the hardware processor is located on an intrusion detection system (IDS), and wherein the IDS is separate from the server.

7. The method of claim 1, wherein the server is a domain name server (DNS).

8. A system for denial of service attack deterrence, comprising:
   a hardware processor; and
   a memory operatively connected to the hardware processor and storing software instructions comprising functionality to:
   identify a plurality of requests sent to a server from a plurality of clients;
   designate at least one of the plurality clients as a malicious client based on the plurality of requests;
   intercept a response issued by the server and in transit to the malicious client, wherein the response corresponds to at least one of the plurality of requests;
   add, in response to intercepting the response, an error to the response by replacing an existing value in the response with a erroneous value; and
   forward the response having the erroneous value to the malicious client.

9. The system of claim 8, wherein the existing value is an internet protocol (IP) address of a website, and wherein the erroneous value is a fictitious IP address.

10. The system of claim 8, wherein the existing value is an internet protocol (IP) address of a website, and wherein the erroneous value is an IP address of the malicious client.

11. The system of claim 8, wherein the existing value is an actual status of the server, and wherein the erroneous value is a fictitious status of the server.

12. The system of claim 8, wherein the server is a domain name server (DNS).

13. The system of claim 8, further comprising:
    a load balancer balancing the plurality of requests received by the server.

14. A non-transitory computer readable medium storing instructions for denial of service attack deterrence, the instructions with functionality to:
    identify a plurality of requests sent to a server from a plurality of clients;
    designate one of the plurality of clients as a malicious client based on the plurality of requests;
    intercept a response issued by the server and in transit to the malicious client, wherein the response corresponds to at least one of the plurality of requests;
    add, in response to intercepting the response, an error to the response by replacing an existing value in the response with a erroneous value; and
    forward the response having the erroneous value to the malicious client.

15. The non-transitory computer readable medium of claim 14, further comprising instructions with functionality to:
    interrupt a TCP/IP handshake between the malicious client and the server,
    wherein the existing value corresponds to a closed status of a connection between the server and the malicious client, and
    wherein the erroneous value corresponds to an open status of the connection.

16. The non-transitory computer readable medium of claim 14, wherein the existing value is an internet protocol (IP) address of a website, and wherein the erroneous value is a fictitious IP address.

17. The non-transitory computer readable medium of claim 14, wherein the existing value is an internet protocol (IP) address of a website, and wherein the erroneous value is an IP address of the malicious client.

18. The non-transitory computer readable medium of claim 14, wherein the existing value is an actual status of the server, and wherein the erroneous value is a fictitious status of the server.

19. The non-transitory computer readable medium of claim 14, wherein the server is a domain name server (DNS).

* * * * *